United States Patent
Chen

(10) Patent No.: US 10,749,369 B2
(45) Date of Patent: Aug. 18, 2020

(54) ELECTRONIC LOCK STRUCTURE USING WIRELESS CHARGING DEVICE

(71) Applicant: Jeff Chen, Chiayi (TW)

(72) Inventor: Jeff Chen, Chiayi (TW)

(*) Notice: Subject to any disclaimer, the term of this patent is extended or adjusted under 35 U.S.C. 154(b) by 151 days.

(21) Appl. No.: 15/990,785

(22) Filed: May 28, 2018

(65) Prior Publication Data

US 2019/0363564 A1 Nov. 28, 2019

(51) Int. Cl.
H02J 7/02 (2016.01)
H02J 50/10 (2016.01)
H02J 7/00 (2006.01)
E05B 47/00 (2006.01)

(52) U.S. Cl.
CPC .............. H02J 7/025 (2013.01); E05B 47/00 (2013.01); H02J 7/0042 (2013.01); H02J 50/10 (2016.02); E05B 2047/0058 (2013.01); E05B 2047/0082 (2013.01); E05Y 2400/614 (2013.01); E05Y 2900/132 (2013.01)

(58) Field of Classification Search
CPC .. H02J 50/10; H02J 50/12; H02J 50/80; H02J 50/60; H02J 50/90; H02J 7/00; H02J 7/02
USPC ................ 307/19, 104, 9.1, 10.1, 52, 18, 66
See application file for complete search history.

(56) References Cited

U.S. PATENT DOCUMENTS

| 9,664,716 | B1* | 5/2017 | Zelm | G01R 27/025 |
| 2002/0129565 | A1* | 9/2002 | Silberman | E04B 7/166 52/66 |
| 2014/0265555 | A1* | 9/2014 | Hall | B60L 58/12 307/9.1 |
| 2016/0221441 | A1* | 8/2016 | Hall | B60L 53/12 |

* cited by examiner

Primary Examiner — Rexford N Barnie
Assistant Examiner — Jagdeep S Dhillon
(74) Attorney, Agent, or Firm — Alan D. Kamrath; Karin L. Williams; Mayer & Williams PC

(57) ABSTRACT

An electronic lock structure using a wireless charging device contains a power supply unit and an electronic lock unit. The power supply unit includes a variable-frequency drive and an AC/DC transformer. The electronic lock unit includes a battery and a rectification circuit, wherein the rectification circuit electrically outputs power of alternative current by way of a power receiving coil. When the power receiving coil is close to the power output coil, the power supply outputs the power to the electronic lock unit by using magnetic flux and to supply the power to the battery, thus charging the battery. When the power receiving coil is away from the power output coil, the power output coil does not conduct the power to the power receiving coil.

3 Claims, 11 Drawing Sheets

ELECTRONIC LOCK STRUCTURE USING WIRELESS CHARGING DEVICE

BACKGROUND OF THE INVENTION

Field of the Invention

The present invention relates to an electronic lock structure using a wireless charging device which when an electronic lock unit is close to a power supply unit, a power receiving coil receives a power output coil of the power supply unit so as to supply the power by using electromagnetism from a magnetic flux, such that the power is supplied to a battery from the power supply unit.

Description of the Prior Art

A lock is fixed on a door so as to lock the door for indoor safety. The lock is in a type of an external lock or an internal lock which has a lock bolt arranged on a front side of the door, and the internal lock and the external lock are individually mounted on inner and outer sides of the door and clamp the lock bolt so that when a key is inserted from outdoors or rotates a button indoors, the lock is unlocked or locked. Furthermore, a conventional electronic lock contains a battery accommodated therein, but the battery cannot be charged after running out of power.

The present invention has arisen to mitigate and/or obviate the afore-described disadvantages.

SUMMARY OF THE INVENTION

The primary objective of the present invention is to provide an electronic lock structure which when an electronic lock unit is close to a power supply unit, a power receiving coil receives a power output coil of the power supply unit so as to supply the power by using electromagnetism from a magnetic flux, such that the power is supplied to a battery from the power supply unit.

To achieve above-mentioned objective, an electronic lock structure provided by the present invention contains a power supply unit and an electronic lock unit.

The power supply unit is coupled with a power source, and the power supply unit includes a variable-frequency drive and an AC/DC transformer, wherein after the power source outputs power to the AC/DC transformer, the AC/DC transformer outputs the power of direct current (DC) to the variable-frequency drive so that the variable-frequency drive of the power supply unit electrically outputs the power of alternative current (AC) so as to produce a power output coil.

The electronic lock unit is opposite to the power supply unit, and the electronic lock unit includes a battery and a rectification circuit, wherein the rectification circuit outputs the power of direct current to the battery, and the rectification circuit electrically outputs the power of alternative current by way of a power receiving coil, wherein when the power receiving coil is close to the power output coil, the power supply outputs the power to the electronic lock unit by using magnetic flux and supplies power to the battery, thus charging the battery. When the power receiving coil is away from the power output coil, the power output coil does not conduct power to the power receiving coil.

When the electronic lock unit is close to the power supply unit, the power receiving coil receives the power output coil of the power supply unit so as to supply power by using electromagnetism from the magnetic flux, such that power is supplied to the battery from the power supply unit. When the electronic lock unit is away from the power supply unit, the power supply unit does not supply power to the battery.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
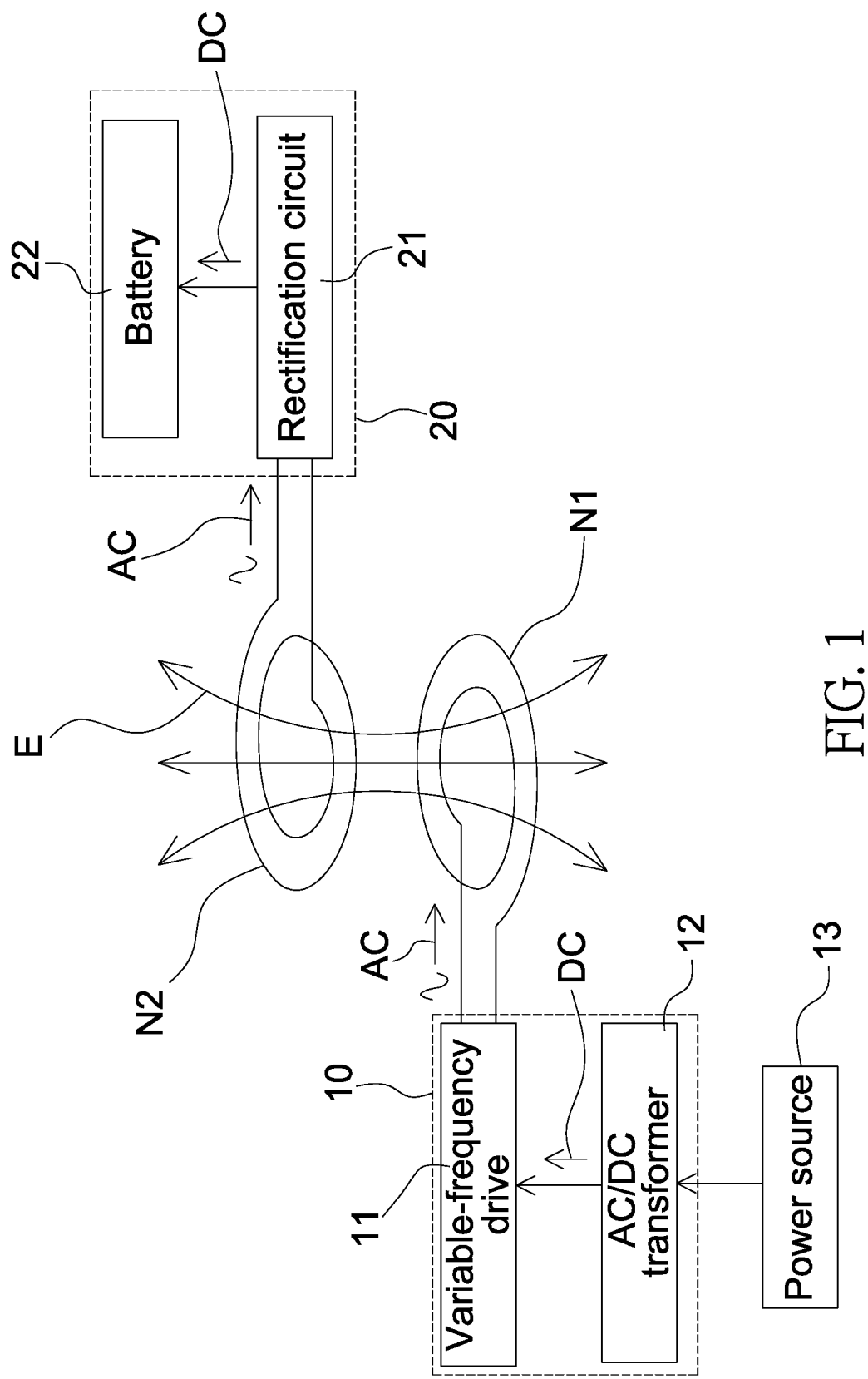
FIG. 1 is a block diagram of an electronic lock structure using a wireless charging device according to a first embodiment of the present invention.
Figure 2:
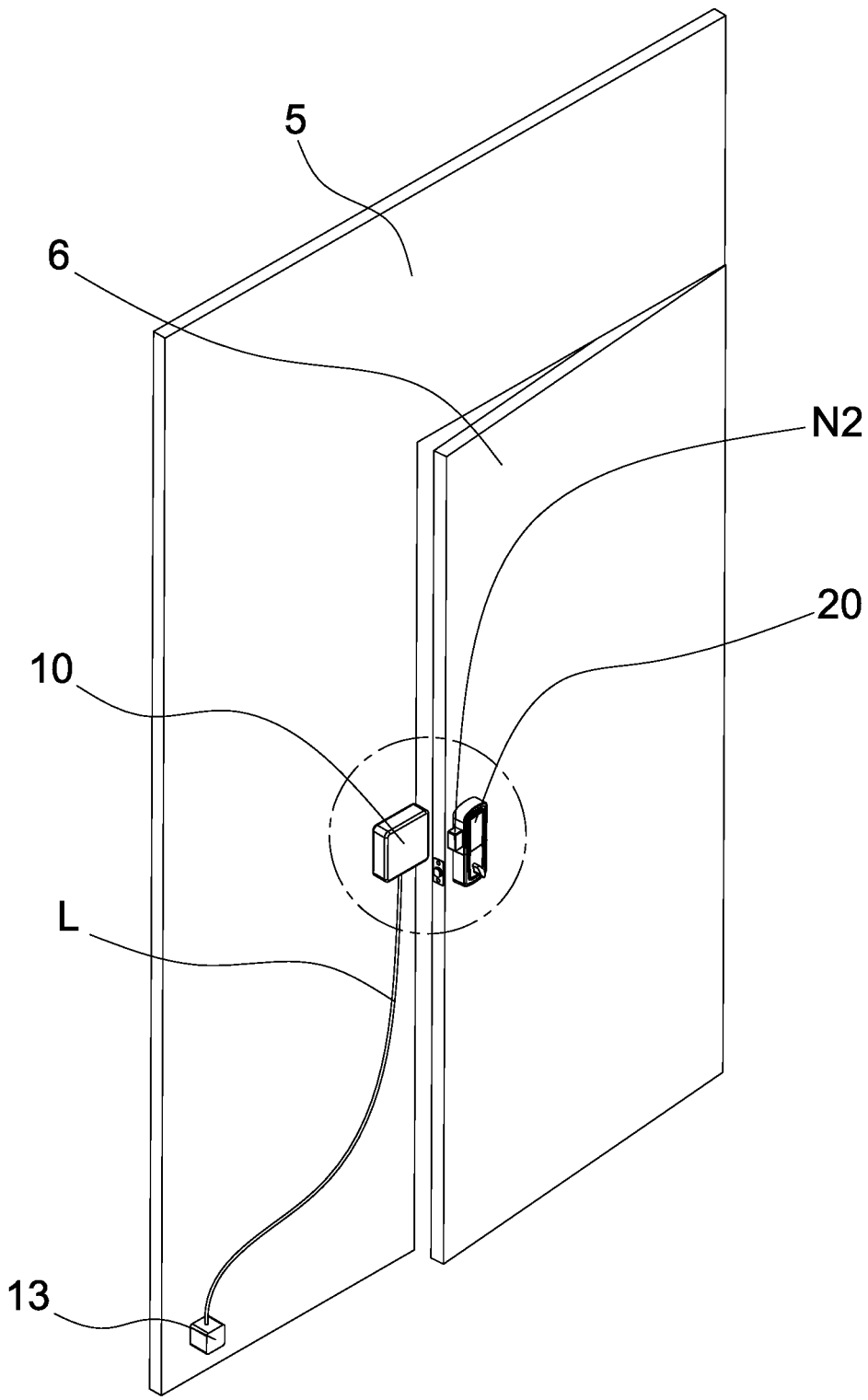
FIG. 2 is a perspective view showing the application of the electronic lock structure using the wireless charging device according to the first embodiment of the present invention.
Figure 3:
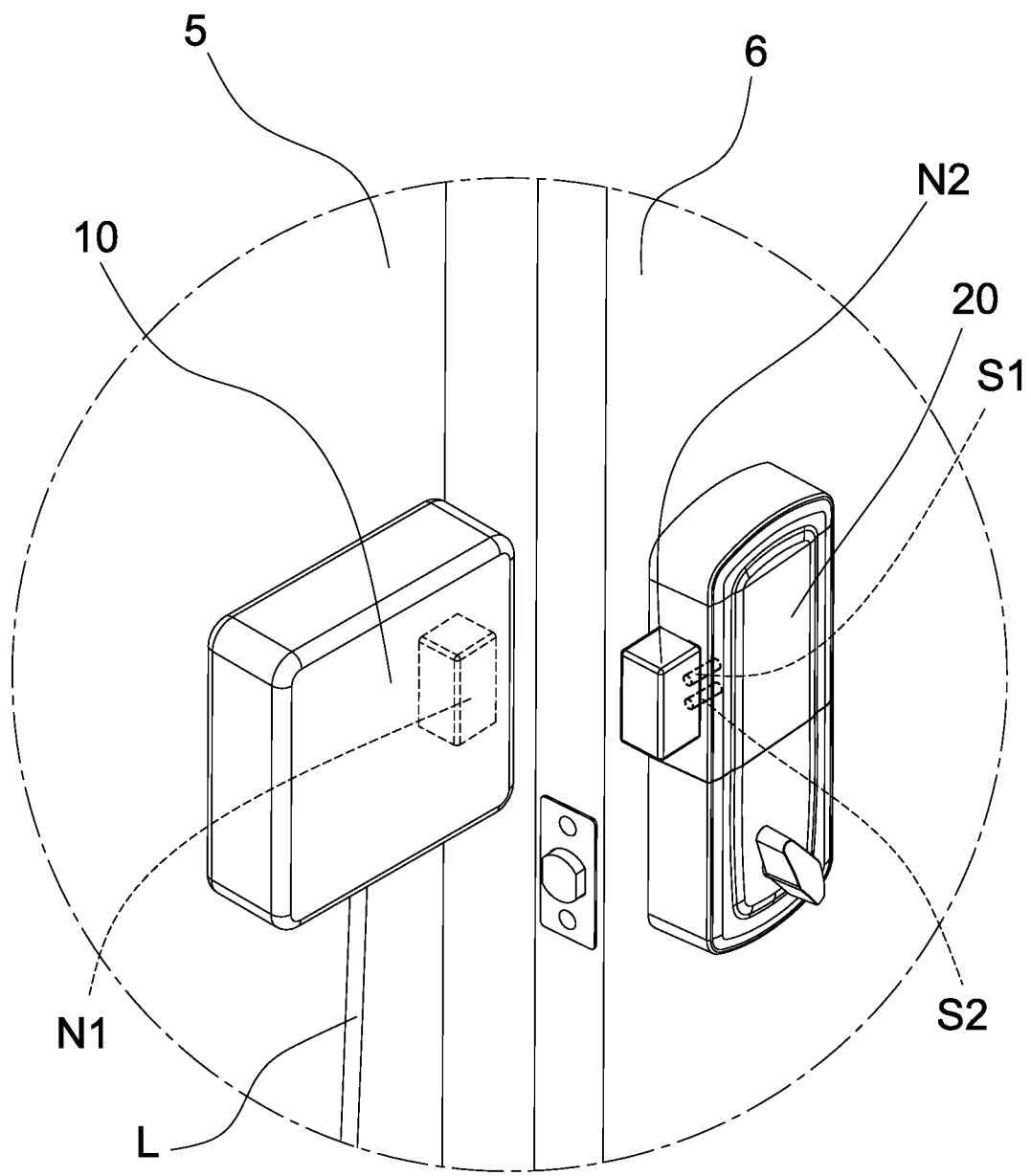
FIG. 3 is an amplified perspective view of a part of FIG. 2.
Figure 4:
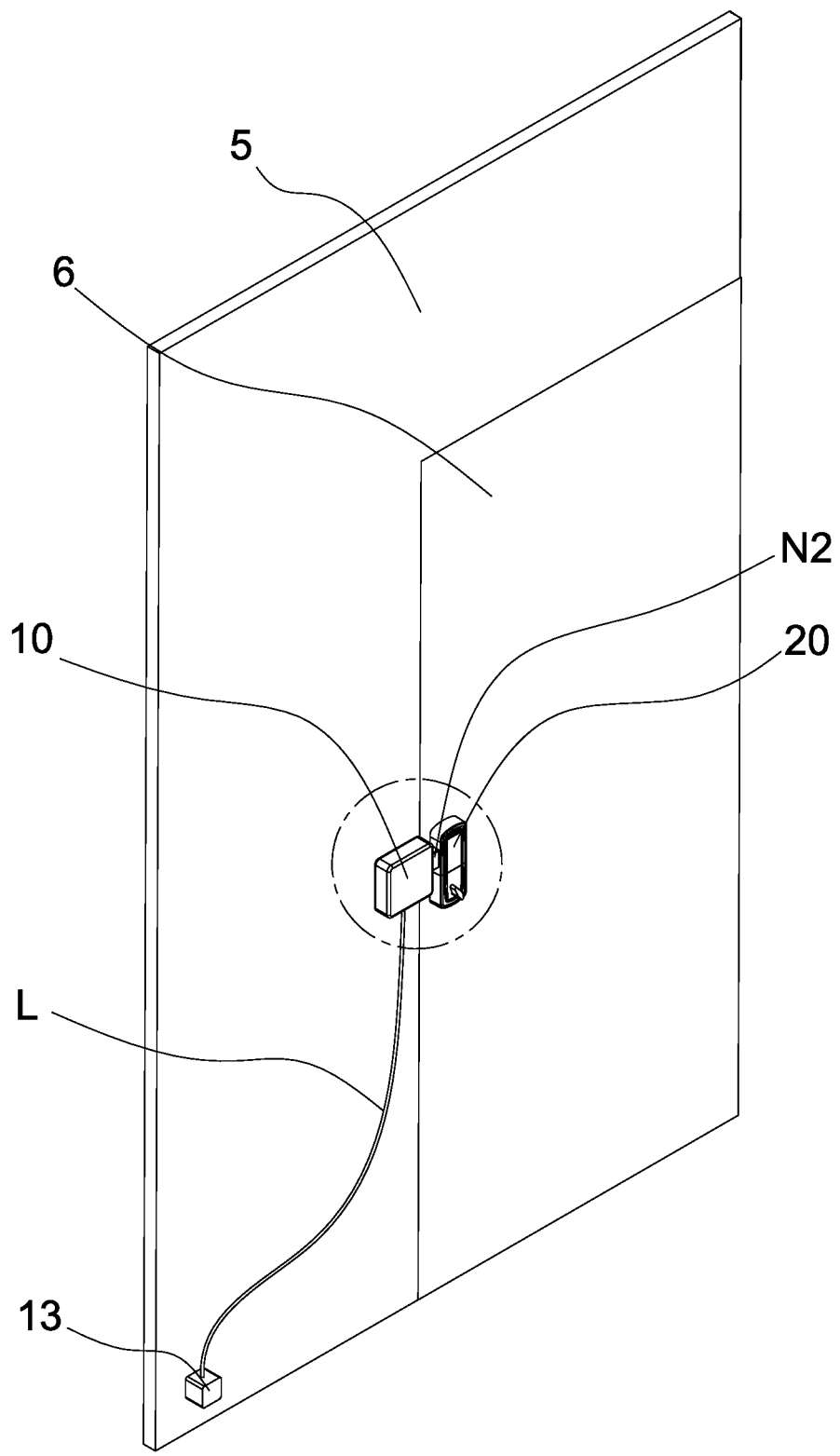
FIG. 4 is another perspective view showing the application of the electronic lock structure using the wireless charging device according to the first embodiment of the present invention.
Figure 5:
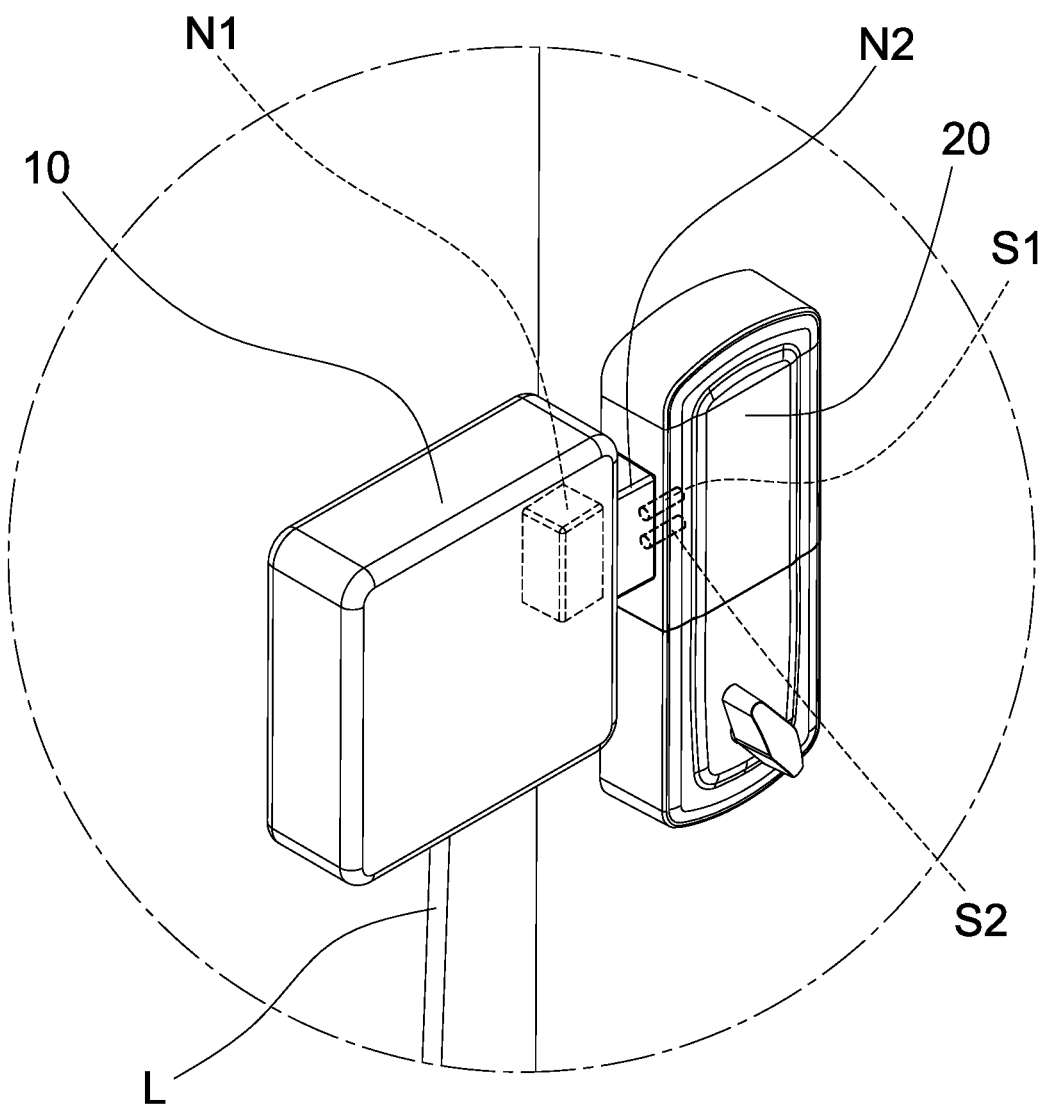
FIG. 5 is an amplified perspective view of a part of FIG. 4.
Figure 6:
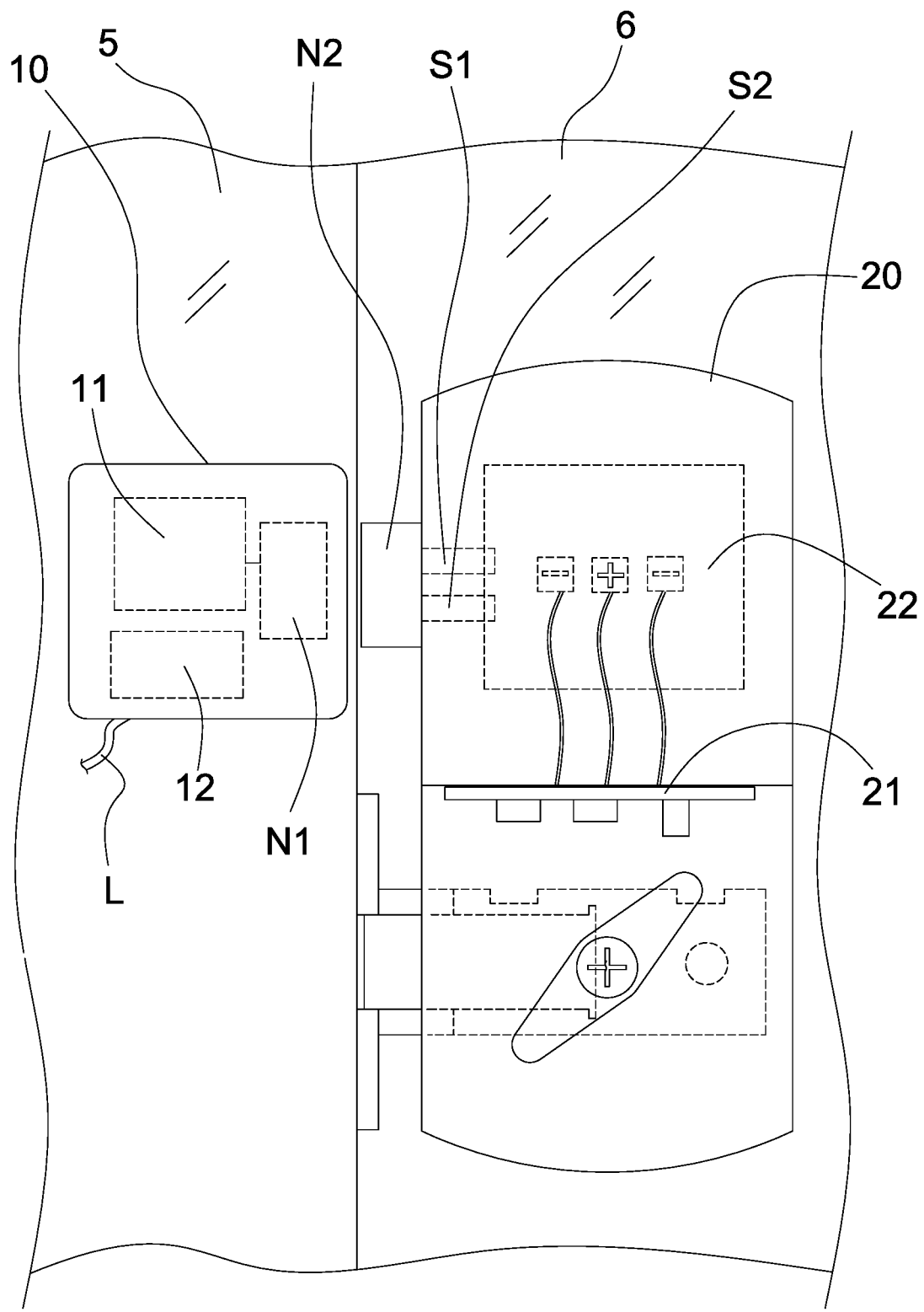
FIG. 6 is a side plan view showing the assembly of the electronic lock structure using the wireless charging device according to the first embodiment of the present invention.
Figure 7:
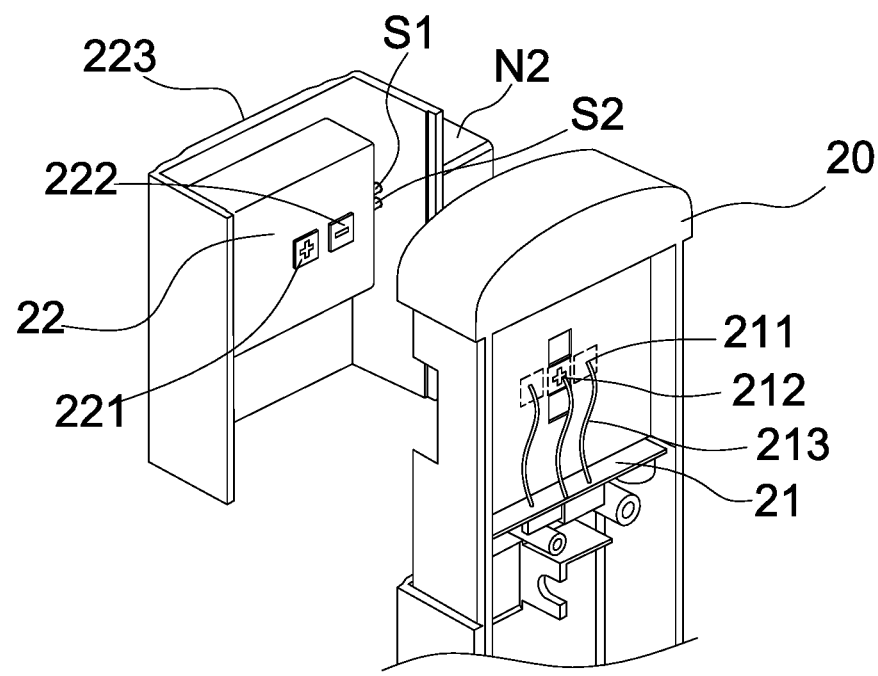
FIG. 7 is a perspective view showing the exploded components of a part of the electronic lock structure using the wireless charging device according to the first embodiment of the present invention.
Figure 8:
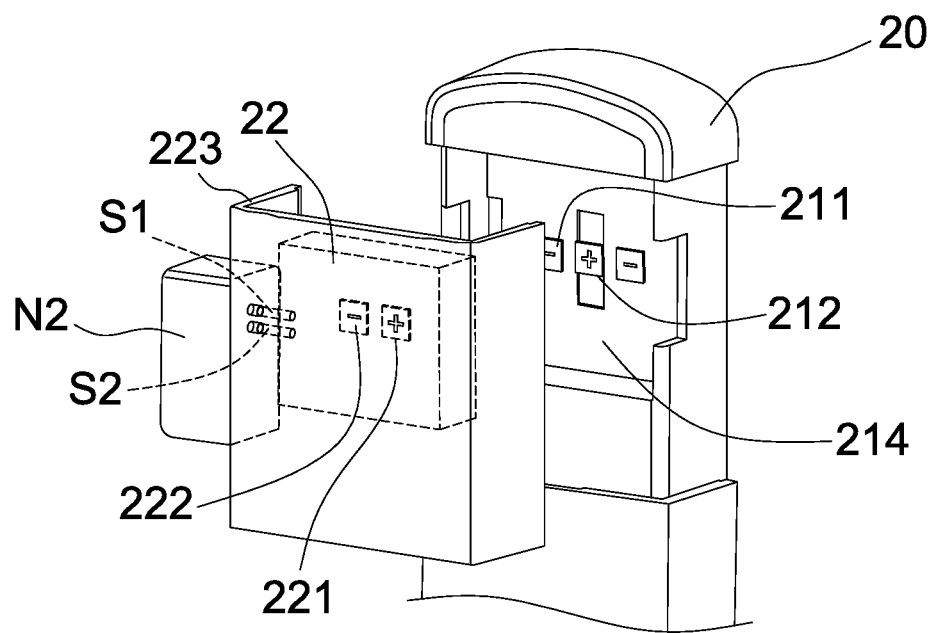
FIG. 8 is another perspective view showing the exploded components of a part of the electronic lock structure using the wireless charging device according to the first embodiment of the present invention.

With reference to FIGS. 1-8, an electronic lock structure using a wireless charging device according to a first embodiment of the present invention includes a power supply unit 10 coupled with a power source 13, the power supply unit 10 including a variable-frequency drive 11 and an AC/DC transformer 12, wherein after the power source 13 outputs power to the AC/DC transformer 12, the AC/DC transformer 12 outputs the power of direct current (DC) to the variable-frequency drive 11 so that the variable-frequency drive 11 of the power supply unit 10 electrically outputs the power of alternative current (AC) so as to produce power output coil, an electronic lock unit 20 opposite to the power supply unit 10, and the electronic lock unit 20 including a battery 22 and a rectification circuit 21, wherein the rectification circuit 21 outputs the power of direct current to the battery 22, and the rectification circuit 21 electrically outputs the power of alternative current by way of a power receiving coil N2, wherein when the power receiving coil N2 is close to the power output coil N1, the power supply 10 outputs the power to the electronic lock unit 20 by using magnetic flux E and to supply the power to the battery 22, thus charging the battery 22. In contrast, when the power receiving coil N2 is away from the power output coil N1, the power output coil N1 does not conduct the power to the power receiving coil N2.

The electronic lock unit 20 is mounted on a door 6 which has a peripheral fence 5 so that the power supply unit 10 is fixed on the peripheral fence 5 and corresponds to the electronic lock unit 20, wherein the electronic lock unit 20 includes an accommodation chamber 214 corresponding to the battery 22, and the electronic lock unit 20 includes a case 223 opposite to the battery 22 so that the battery 22 is disposed on the case 223, when the case 223 covers the accommodation chamber 214, the battery 22 is accommodated in the accommodation chamber 214, wherein the case 223 has the power receiving coil N2 arranged on an outer edge thereof so as to correspond to the battery 22, the power receiving coil N2 has a first conductive element S1 and a second conductive element S2 which correspond to the battery 22, the battery 22 has a positive electrode contact 221 and a negative electrode contact 222 which respectively conduct with the first conductive element S1 and the second conductive element S2, and the accommodation chamber 214 has a positive-electrode connection segment 211 and a negative-electrode connection segment 212 which are formed on an inner surface of the accommodation chamber 214, wherein a first end of positive electrode contact 221 conducts with the positive-electrode connection segment 211, and a first end of the negative electrode contact 222 conducts with the negative-electrode connection segment 212, second ends of the positive-electrode connection segment 211 and the negative-electrode connection segment 212 respectively couple with a wire assembly 213, wherein the positive-electrode connection segment 211 and the negative-electrode connection segment 212 are arranged inside the rectification circuit 21. The power supply unit 10 and the peripheral fence 5 are individually arranged on left sides of the electronic lock unit 20 and the door 6, and the electronic lock unit 20 and the door 6 are individually arranged on right sides of the power supply unit 10 and the peripheral fence 5.

Figure 9:
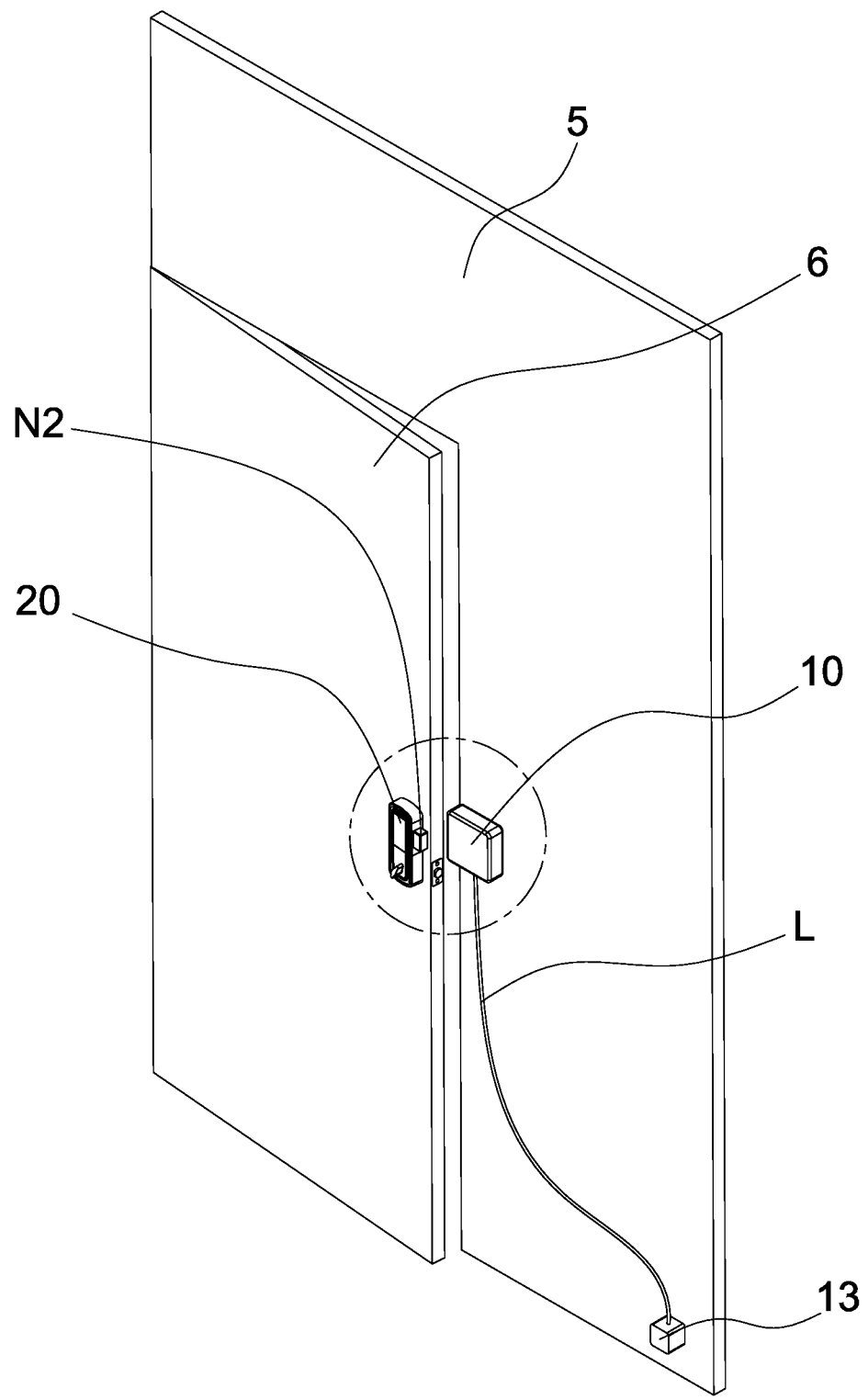
FIG. 9 is a perspective view showing the application of an electronic lock structure using a wireless charging device according to a second embodiment of the present invention.
Figure 10:
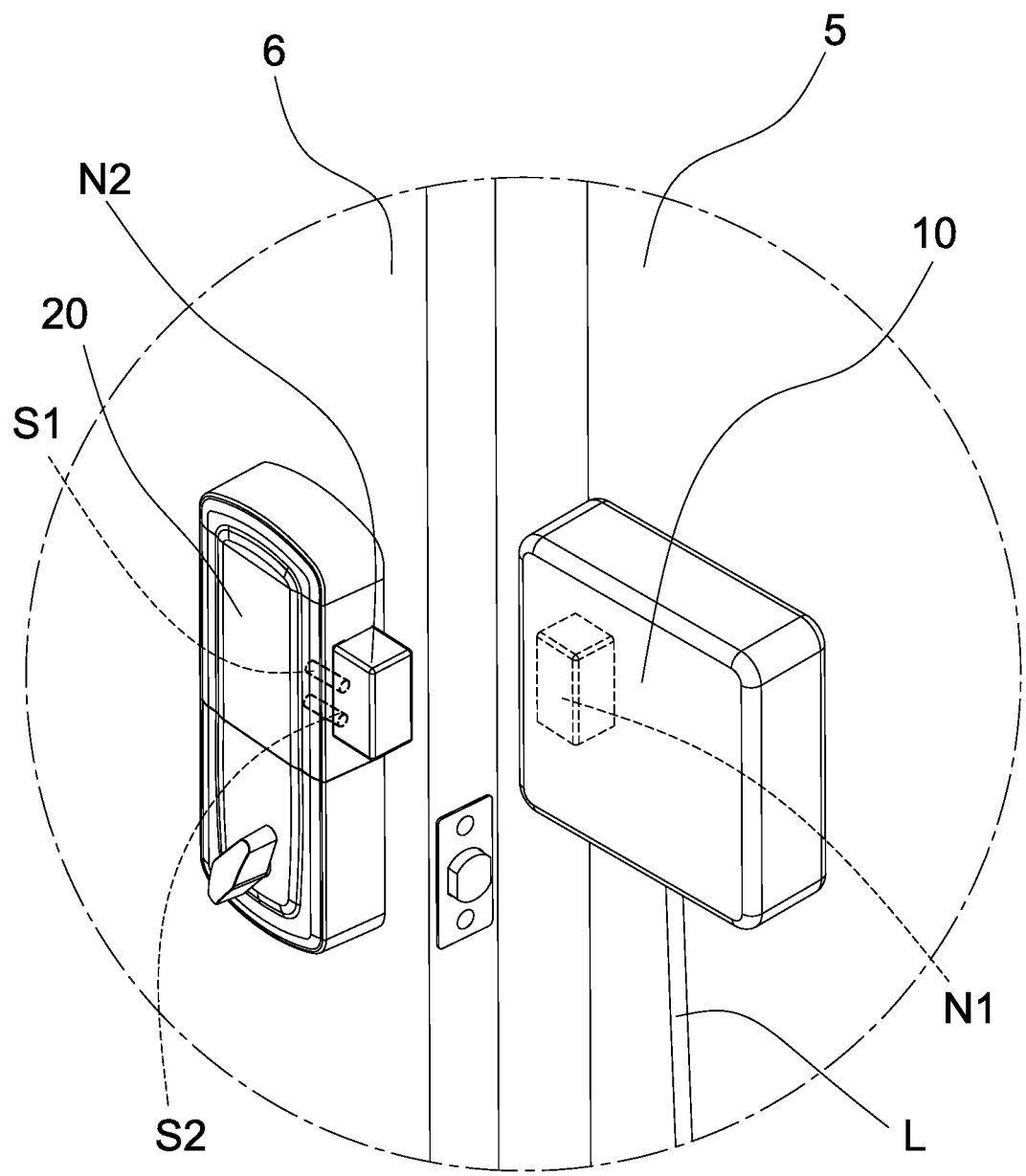
FIG. 10 is an amplified perspective view of a part of FIG. 9.
Figure 11:
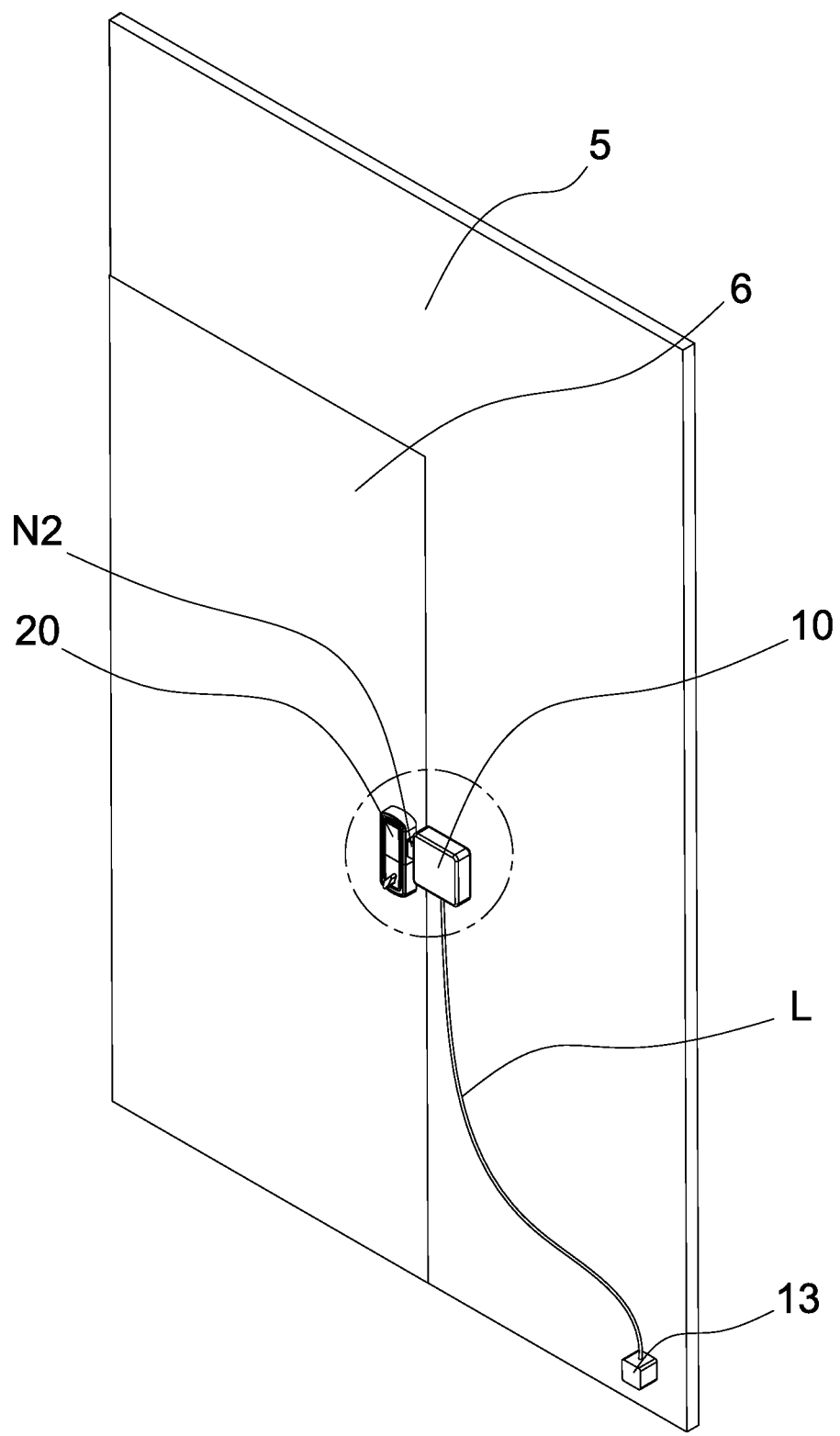
FIG. 11 is another perspective view showing the application of the electronic lock structure using the wireless charging device according to the second embodiment of the present invention.
Figure 12:
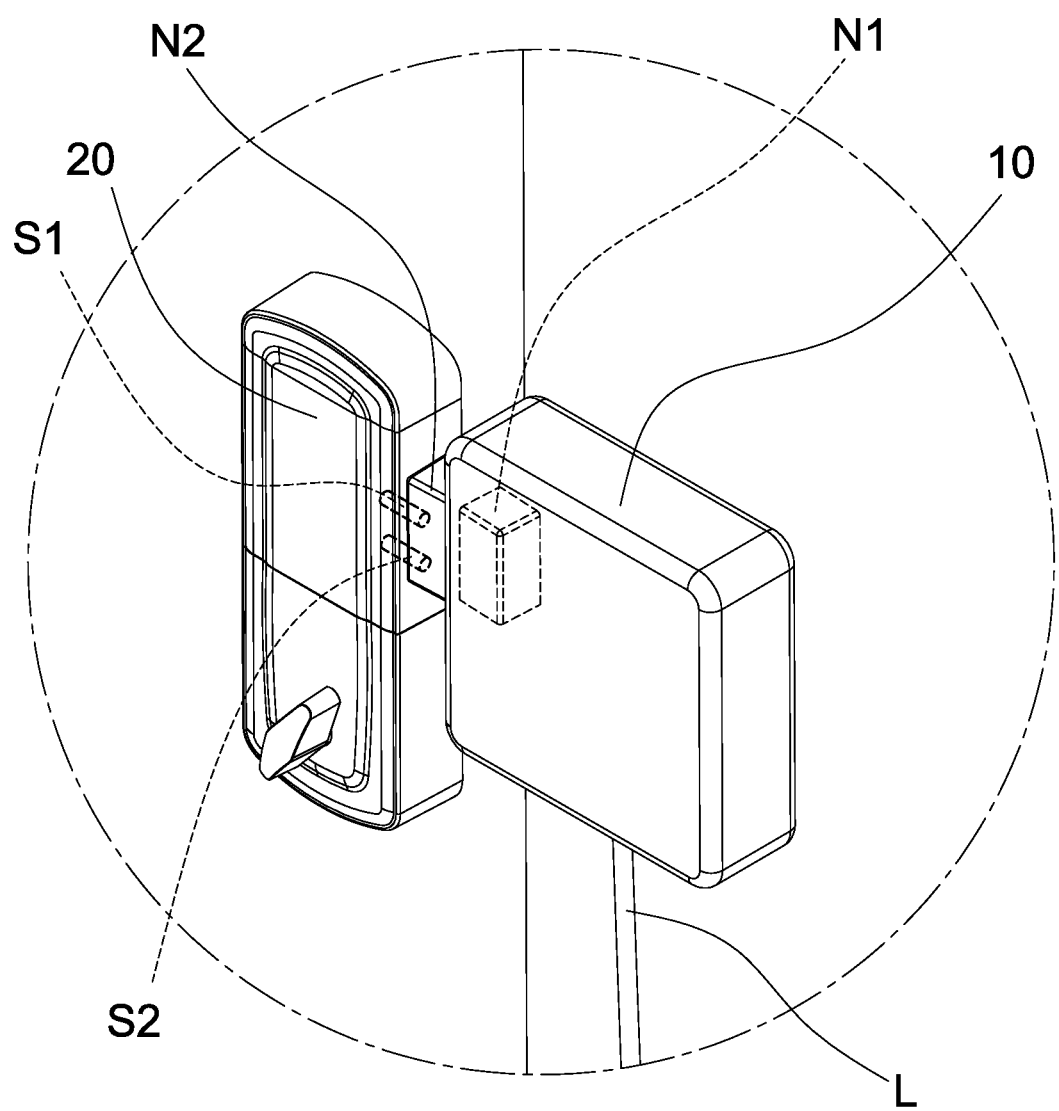
FIG. 12 is an amplified perspective view of a part of FIG. 11.

Referring to FIGS. 9-12, in a second embodiment, the power supply unit 10 and the peripheral fence 5 are respectively arranged on right sides of the electronic lock unit 20 and the door 6, and the electronic lock unit 20 and the door 6 are individually arranged on left sides of the power supply unit 10 and the peripheral fence 5.

Thereby, when the door 6 is opened or closed, the electronic lock unit 20 is close to or away from the battery 22 so as to charge or not charge the battery 22. For example, when the electronic lock unit 20 is close to the power supply unit 10, the power receiving coil N2 receives the power output coil N1 of the power supply unit 10 so as to supply the power by using electromagnetism from the magnetic flux E, such that the power 13 is supplied to the battery 22 from the power supply unit 10. When the electronic lock unit 20 is away from the power supply unit 10, the power supply unit 10 does not supply the power 13 to the battery 22. Accordingly, the electronic lock unit of the present invention is charged successively.

While various embodiments in accordance with the present invention have been shown and described, it is clear to those skilled in the art that further embodiments may be made without departing from the scope of the present invention.

What is claimed is:

1. An electronic lock structure using a wireless charging device comprising:

a power supply unit coupled with a power source, and the power supply unit including a variable-frequency drive and an AC/DC transformer, wherein after the power source outputs power to the AC/DC transformer, the AC/DC transformer outputs the power of direct current to the variable-frequency drive so that the variable-frequency drive of the power supply unit electrically outputs the power of alternative current so as to produce power output coil;

an electronic lock unit opposite to the power supply unit, and the electronic lock unit including a battery and a rectification circuit, wherein the rectification circuit outputs the power of direct current to the battery, and the rectification circuit electrically outputs the power of alternative current by way of a power receiving coil, wherein when the power receiving coil is close to the power output coil, the power supply outputs the power to the electronic lock unit by using magnetic flux and to supply the power to the battery, thus charging the battery; when the power receiving coil is away from the power output coil, the power output coil does not conduct the power to the power receiving coil, wherein the electronic lock unit is mounted on a door which has a peripheral fence so that the power supply unit is fixed on the peripheral fence and corresponds to the electronic lock unit, wherein the electronic lock unit includes an accommodation chamber corresponding to the battery, and the electronic lock unit includes a case opposite to the battery so that the battery is disposed on the case, when the case covers the accommodation chamber, the battery is accommodated in the accommodation chamber, wherein the case has the power receiving coil arranged on an outer edge thereof so as to correspond to the battery, the power receiving coil has a first conductive element and a second conductive element which correspond to the battery, the battery has a positive electrode contact and a negative electrode contact which respectively conduct with the first conductive element and the second conductive element, and the accommodation chamber has a positive-electrode connection segment and a negative-electrode connection segment which are formed on an inner surface of the accommodation chamber, wherein first ends of positive electrode contact and the negative electrode contact respectively conducts with the positive-electrode connection segment and the negative-electrode connection segment, second ends of the positive-electrode connection segment and the negative-electrode connection segment respectively couple with a wire assembly, wherein the positive-electrode connection segment and the negative-electrode connection segment are arranged inside the rectification circuit.

2. The electronic lock structure as claimed in claim 1, wherein the power supply unit and the peripheral fence are individually arranged on left sides of the electronic lock unit and the door, and the electronic lock unit and the door are individually arranged on right sides of the power supply unit and the peripheral fence.

3. The electronic lock structure as claimed in claim 1, wherein the power supply unit and the peripheral fence are respectively arranged on right sides of the electronic lock unit and the door, and the electronic lock unit and the door are individually arranged on left sides of the power supply unit and the peripheral fence.

* * * * *